(12) United States Patent
Lange et al.

(10) Patent No.: US 6,587,230 B1
(45) Date of Patent: *Jul. 1, 2003

(54) APPARATUS FOR SCANNING MASTERS

(75) Inventors: Helmut Lange, Schönkirchen (DE); Axel Heuer, Fahren (DE); Axel Gebhardt, Mönkeberg (DE); Bernd Lassen, Mönkeberg (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/405,449

(22) Filed: Sep. 24, 1999

(30) Foreign Application Priority Data

Sep. 30, 1998 (DE) .......................... 198 44 775
Aug. 4, 1999 (DE) .......................... 199 36 621

(51) Int. Cl.[7] .................. H04N 1/04; H04N 1/38; H04N 1/00; G01N 21/00; G01N 21/49
(52) U.S. Cl. ............ 358/493; 358/484; 358/475; 358/465; 358/406; 250/574; 356/239
(58) Field of Search ............... 358/493, 484, 358/475, 464, 406; 250/574; 356/239

(56) References Cited

U.S. PATENT DOCUMENTS 3,872,248 A * 3/1975 Winters ................ 358/472
4,517,608 A 5/1985 Maeda et al.
4,568,984 A * 2/1986 Juergensen et al. ......... 358/484
4,742,401 A * 5/1988 Andree et al. .............. 358/493
4,897,737 A * 1/1990 Shalev ...................... 358/489
5,929,435 A * 7/1999 Han .......................... 250/234

FOREIGN PATENT DOCUMENTS

EP 0 270 011 8/1988

* cited by examiner

Primary Examiner—Edward Coles
Assistant Examiner—Houshang Safaipour
(74) Attorney, Agent, or Firm—Schiff Hardin & Waite

(57) ABSTRACT

In an apparatus for point-by-point and line-by-line, optoelectronic scanning of masters chucked on a scanner drum, an illumination unit is provided for generating an illumination spot on the master. A scanner objective, a scanner element and a feed support is provided at which the illumination unit, the scanner objective and the scanner element are arranged. The illumination unit comprises a light conductor that is aligned in the direction of the rotational axis of the scanner drum and has a light exit face for generating a light spot and has optical elements for imaging the light spot onto the master as an illumination spot. At least a sub-section of the light conductor in the region of the light exit face can be inclined by small angles relative to the rotational axis with a Cardanic bearing for fine adjustment of optical beam paths, as a result whereof the illumination spot is displaced on the scanner drum. The slope of the light conductor that has been found to be optimum is then fixed.

16 Claims, 4 Drawing Sheets

APPARATUS FOR SCANNING MASTERS

BACKGROUND OF THE INVENTION

The invention is in the field of electronic reproduction technology and is directed to an apparatus for pixel-by-pixel and line-by-line, opto-electronic scanning of masters chucked on a scanner drum. Such a scanner drum apparatus, referred to below as a drum scanner, can be designed for scanning black-and-white or chromatic masters in reflected light and/or transmitted light.

A drum scanner for scanning transparency masters is composed, for example, of a rotating, transparent scanner drum onto which a transparency master to be scanned is chucked, of a light source for pixel-by-pixel illumination of the transparency master, and of a scanner element with a scanner objective, a scanner diaphragm and an opto-electronic transducer for converting the scan light the transparency master allows to pass into an image signal that represents the luminance values of the scanned pixels.

The light required for the pixel-by-pixel illumination of the transparency master is, for example, transported from a light source located outside the scanner drum through a light conductor into the hollow-cylindrical interior of the scanner drum and is imaged as a focal spot onto the transparency master therein with a matching objective and a deflection mirror. The scan light modulated with the image content of the transparency master proceeds through the scanner objective into the scanner element located outside the scanner drum and is converted therein into an image signal by opto-electronic conversion.

The scanner element on the one hand and the optical elements on the other hand are respectively secured to an arm of a U-shaped feed support, whereby the arm carrying the optical elements projects into the scanner drum at the end face.

For planar scanning of the transparency master, the feed support moves in the axial direction of the rotating scanner drum.

In order to be able to scan masters having different formats, scanner drums having different diameters usually are delivered together with a drum scanner, these being chucked in the drum scanner dependent on the format of the master to be scanned. In this case, lens systems must be manually interchanged at the feed support for optimum setting of the size of the illumination spot on the transparency master in order to compensate the different radial spacings between the central arm of the feed support and the generated service of the respective scanner drum. For optimum focusing of the brightness-modulated scan light coming from the transparency master onto the scanner diaphragm, the scanner element is equipped with interchangeable lenses that must be manually pivoted into the beam path dependent on the diameter of the scanner drum employed. The employment of such sets of lenses and interchangeable objectives is relatively complicated.

Occasionally, device-specific, optical fine adjustment must also be implemented, for example for compensation of mechanical and/or optical tolerances in the apparatus assembly or when replacing optical components. These fine adjustments are particularly involved when scanner drums having different diameters are employed in a drum scanner.

SUMMARY OF THE INVENTION

It is therefore an object of the invention to improve an apparatus for pixel-by-pixel and line-by-line, opto-electronic scanning of masters chucked on scanner drums such that optical adaptations and corrections, particularly given employment of scanner drums having different diameters, can be implemented in a simple way and automatically to the farthest-reaching extent.

According to the present invention, an apparatus is provided for point-by-point and line-by-line, opto-electronic scanning of a master. A scanner drum is provided for chucking a master to be scanned. An illumination unit generates an illumination spot on the master. A scanner objective is provided. The scanner element converts the scan light modulated with a content of the master and focused with the scanner objective into an image signal. A feed support is provided at which the illumination unit, the scanner objective, and the scanner element are arranged, whereby the feed support implements a feed motion in the direction of the rotational axis of the scanner drum for scanning of the master. The illumination unit comprises a light conductor aligned substantially in a direction of a rotational axis of the scanner drum and has a light exit face for generating a light spot and a matching objective for imaging the light spot onto the master as the illumination spot. At least a sub-section of the light conductor is seated inclinable by small angles relative to the rotational axis in the region of the light exit face for fine adjustment of optical beam paths, as a result whereof the illumination spot is displaced on the scanner drum.

The invention is explained in greater detail below with reference to FIGS. 1 through 4.

DESCRIPTION OF THE PREFERRED EMBODIMENTS

Figure 1:
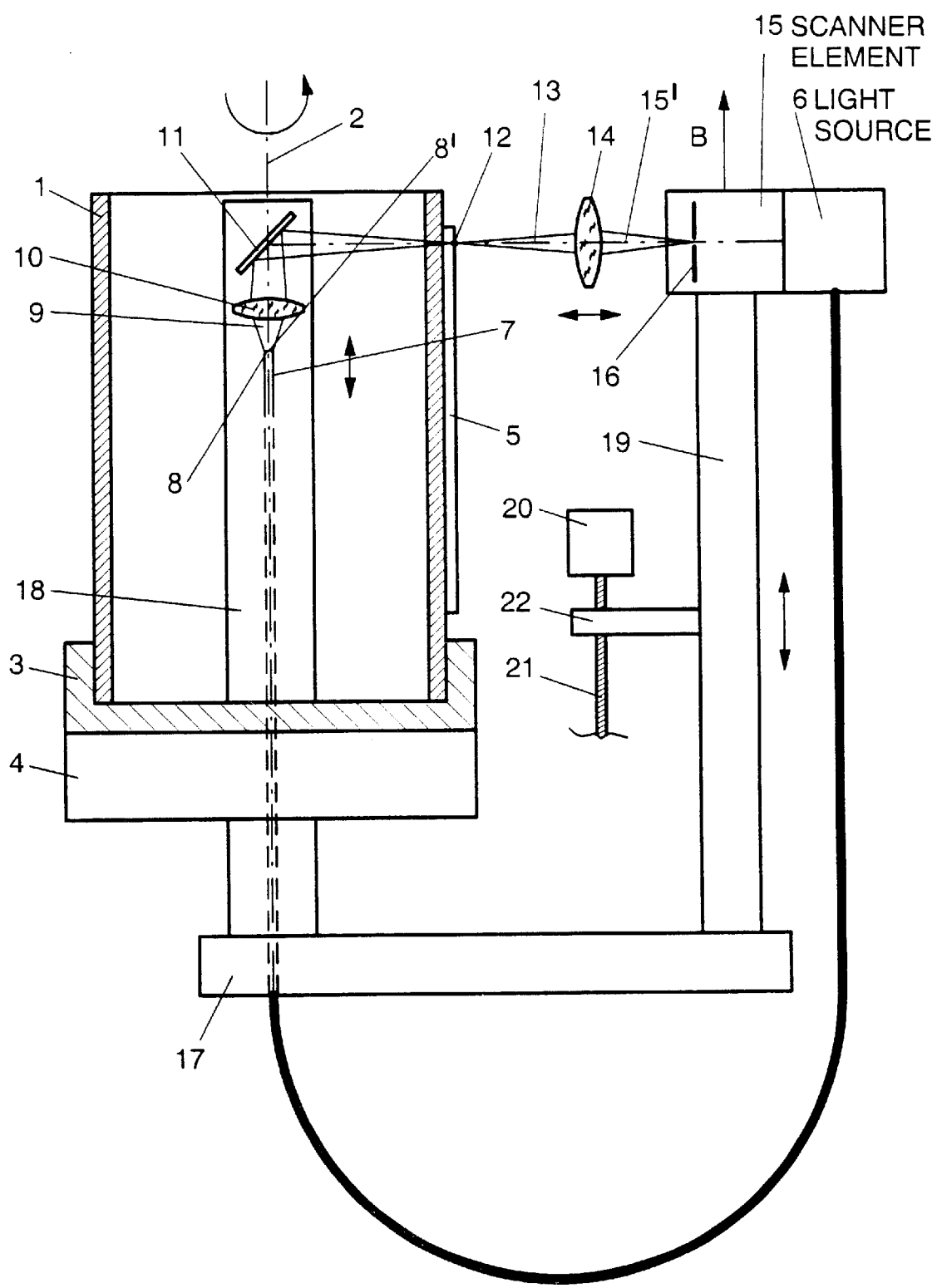
FIG. 1 is a schematic structure of a drum scanner.

FIG. 1 shows the fundamental structure of a drum scanner. A transparent scanner drum 1 having, for example, a vertical rotational axis 2 is coupled to a rotational drive 4 with a clamp mechanism 3. The rotational axis 2 of the scanner drum can also be arranged horizontally or in an arbitrary angle relative to the floor space of the drum scanner.

A transparency master 5 is mounted on the scanner drum. For scanning transparency masters 5 having different formats, scanner drums having different diameters are chucked in the drum scanner with the assistance of the clamp mechanism 3. The clamp mechanism 3 is constructed for example, according to German Utility Model 296 23 523 and the rotational drive is constructed according to German Published Application 196 01 524.

For pixel-by-pixel illumination of the transparency master 5, an illumination unit 7, 8, 10, 11 is provided in the hollow-cylindrical interior of the scanner drum, the illumination unit being fed by a light source 6 located outside the scanner drum. A light beam generated by the light source 6 is transported into the illumination unit through a light conductor 7 and emerges through a light exit face 8 of the light conductor 7 in the direction of the rotational axis 2. The light beam 9 that has emerged is deflected in the radial direction onto the transparency master 5 with a matching objective 10 in the rotational axis 2 and a deflection mirror 11 arranged at 45° relative to the rotational axis 2, as a result whereof a light spot 8' in the light exit face 8 of the light conductor 7 is imaged onto the transparency master 5 as an illumination spot 12.

The scan light 13 that the transparency master 5 allows to pass and that is modulated with the luminance values of the scanned picture elements proceeds through a scanner objective 14 into a scanner element 15 located outside the scanner drum and having a scanner diaphragm 16 and an opto-electronic transducer not shown, whereby illumination spots 12 and scanner objective 14 lie on the optical axis 15' of the scanner element 15 proceeding radially relative to the scanner drum 1.

In the scanner element 15, the scan light 13 is converted with the opto-electronic transducer into an image signal B for further processing. The scanner element 15 and light source 6 are structurally united in the illustrated exemplary embodiment. The scanner objective 14, scanner element 15 and light source 6 move axially along the rotating scanner drum 1 for planar master scanning.

So that the illumination spot 12 given planar master scanning always lies in the optical axis 15' of the scanner element 15, at least the deflection mirror 11 —the illumination unit with light conductor 7, matching objective 10 and deflection mirror 11 in the exemplary embodiment— must be synchronously entrained in the axial direction with the scanner objective 14 and the scanner element 15. For that purpose, a U-shaped feed support 17 having an inner arm 18 and an outer arm 19 is present, this being moved in the axial direction of the scanner drum during the master scanning by a feed drive 20 with the assistance of a spindle 21 and a nut segment 22 located at the feed support 17. The inner arm 18 of the feed support 17 is guided by the rotational drive 4, projects into the scanner drum 1 at the end face, and extends along the rotational axis 2. The inner arm 18 carries the illumination unit 7, 8, 10, 11. The outer arm 19 of the feed support 17 proceeding parallel to the inner arm carries the scanner objective 14, the scanner element 15 and the light source 6.

For scanning opaque masters, a reflected light illumination not shown is provided that generates a corresponding illumination spot 12 on the opaque master. In this case, the modulated scan light 13 reflected from the opaque master to be scanned is converted into an image signal B in the scanner element 15.

When scanner drums 1, 1' having different diameters are chucked in the drum scanner, the distance between the deflection mirror 11 and the transparency master 5 mounted on the scanner drum 1 as well as the distance between the transparency master 5 and the scanner diaphragm 16 in the scanner element 15 change. In this case, the size of the illumination spot 12 on the transparency master 5 and the focusing of the scan light 13 coming from the transparency master 5 onto the scanner diaphragm 16 must be corrected.

The size correction of the illumination spot 12 on the transparency master 5 advantageously occurs with an automatic change of the imaging scale with which the light spot 8' of the light exit face 8 of the light conductor 7 is imaged on the transparency master 5 as an illumination spot 12. The modification of the imaging scale is preferably achieved by modifying the distance between the light exit face 8 of the light conductor 7 and the matching objective 10 stationarily secured at the inner arm 18, preferably by displacing the light conductor 7 on the inner arm 18 into axial working positions $A_k$ and $A_g$ in the direction of the rotational axis 2 of the scan drums 1, these working positions being prescribed by the diameter of the respectively employed scanner drum 1, 1', as a result whereof an optimum illumination of the transparency master 5 is achieved given employment of scanner drums 1, 1' having different diameters.

The recorrection of the focusing of the scan light 13 onto the scanner diaphragm 16 in the scanner element 15 occurs by modifying the radial distance between the generated surface of the respective scanner drum 1, 1' and the scanner objective 14 by displacing the scanner objective 14 into radial working positions $B_k$ and $B_g$ that are prescribed by the diameter of the scanner drums 1, 1' respectively employed.

Figure 2:
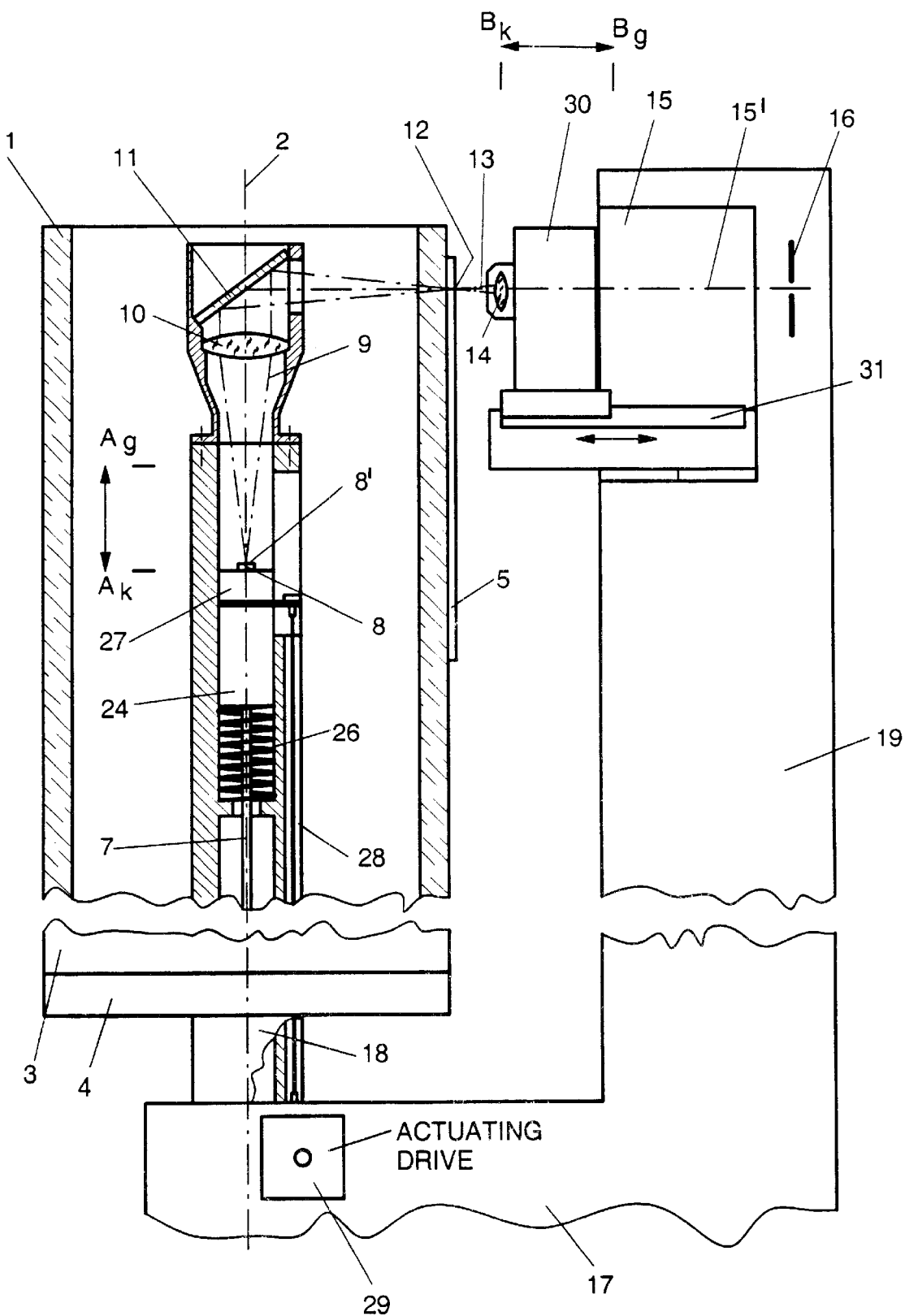
FIG. 2 is an exemplary embodiment of the devices for axial displacement of a light conductor and for radial displacement of a scanner objective, as well as the positioning of the light conductor and the scanner objective given employment of a scanner drum having a small diameter.

FIG. 2 shows an exemplary embodiment of the devices for axial displacement of the light conductor 7 at the inner arm 18 and for radial displacement of the scanner objective 14 at the outer arm 19 of the feed support 17, as well as the positioning of the light conductor and of the scanner objective given employment of a scanner drum 1 having a small diameter.

The end region of the light conductor 7 with the light exit face 8 is enveloped by a cylindrical light conductor mount 24 that is seated in sliding fashion in the hollow-cylindrical inner arm 18 of the feed support 17. A compression spring 26 is arranged between the recess 25 at the inside wall of the inner arm 18 and the light conductor mount 24. A radial finger 27 is attached to the light conductor mount 24, the radial finger being connected to a controllable actuating drive 29 via a tension cable 28 proceeding in the direction of the inner arm 18. The actuating drive 29 is, for example, a stepping motor that drives a cable drum. The actuating drive 29 is preferably attached to the feed support 17. The light conductor mount 24 and, thus, the light exit face 8 of the light conductor 7 is automatically displaced into one of the two axial working positions $A_k$ or $A_g$ corresponding to the diameter of the scanner drum 1, 1' used at the moment— into the axial working position $A_k$ for the scanner drum 1 with a small diameter in the illustrated example—, being displaced therein against the force of the compression spring 26 with the controllable actuating drive 29 and the tension cable 28 and being fixed thereat.

The scanner objective 14 is mounted on an objective holder 30 that is displaced with an actuating drive not shown with guides 31 onto one of the two radial working positions $B_k$ or $B_g$ according to the diameter of the scanner drums 1, 1' employed at the moment—into the radial working position $B_k$ for the scanner drum 1 having a small diameter in the illustrated example—and is fixed thereat.

Figure 3:
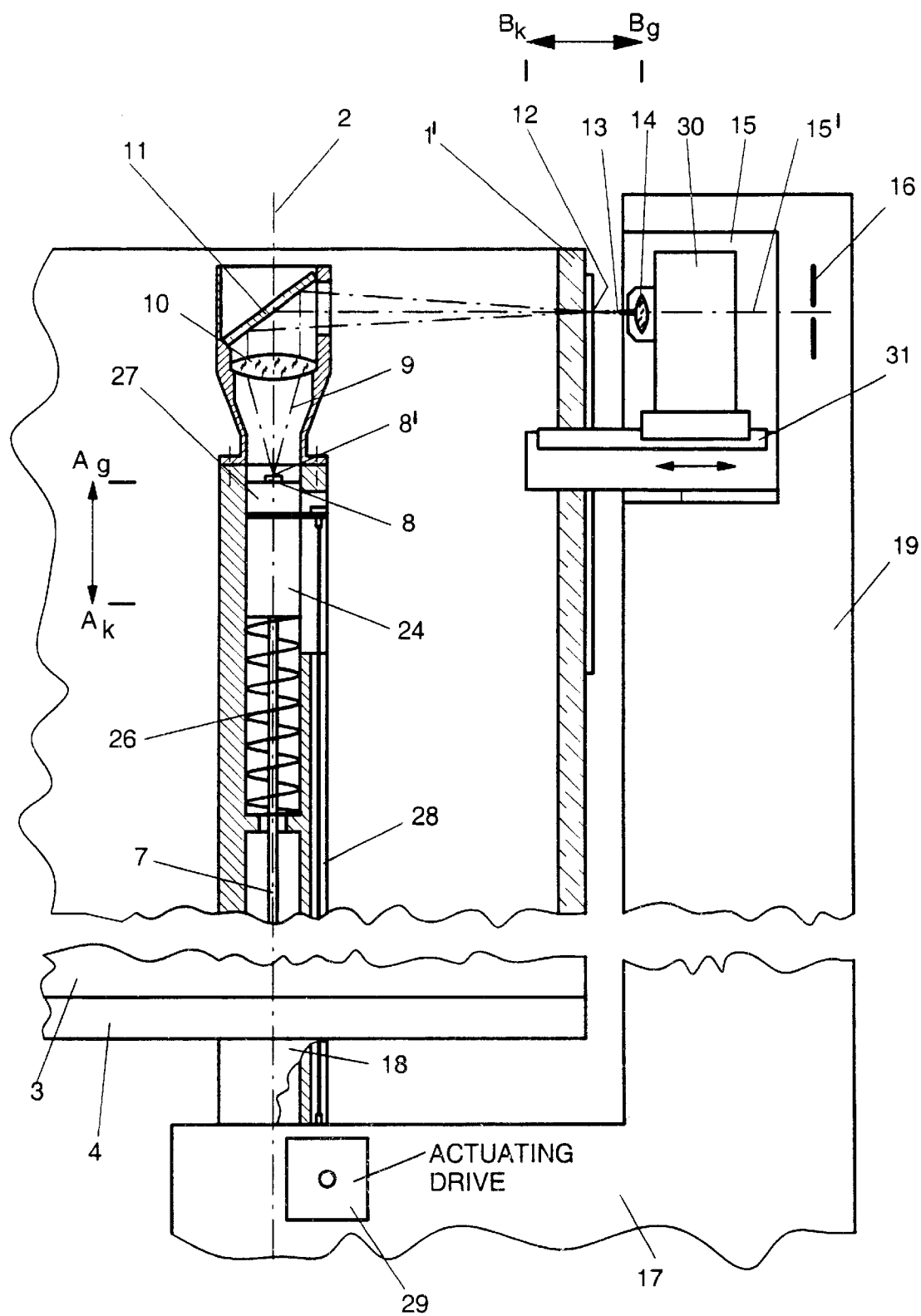
FIG. 3 shows the positioning of the light conductor and of the scanner objective given employment of a scanner drum having a large diameter.

FIG. 3 shows the positioning of the light conductor 7 and of the scanner objective 14 given employment of a scanner drum 1' having a large diameter. In this case, the exit face 8 of the light conductor 7 is displaced into the axial working position $A_g$, and the objective mount 30 with the scanner objective 14 is displaced into the radial working position $B_g$.

It can be seen from FIGS. 2 and 3 that an optimum size of the illumination spot 12 and an optimum focusing of the scan light 13 onto the scanner element 15 is advantageously achieved given different diameters of the scanner drums 1, 1'.

Figure 4:
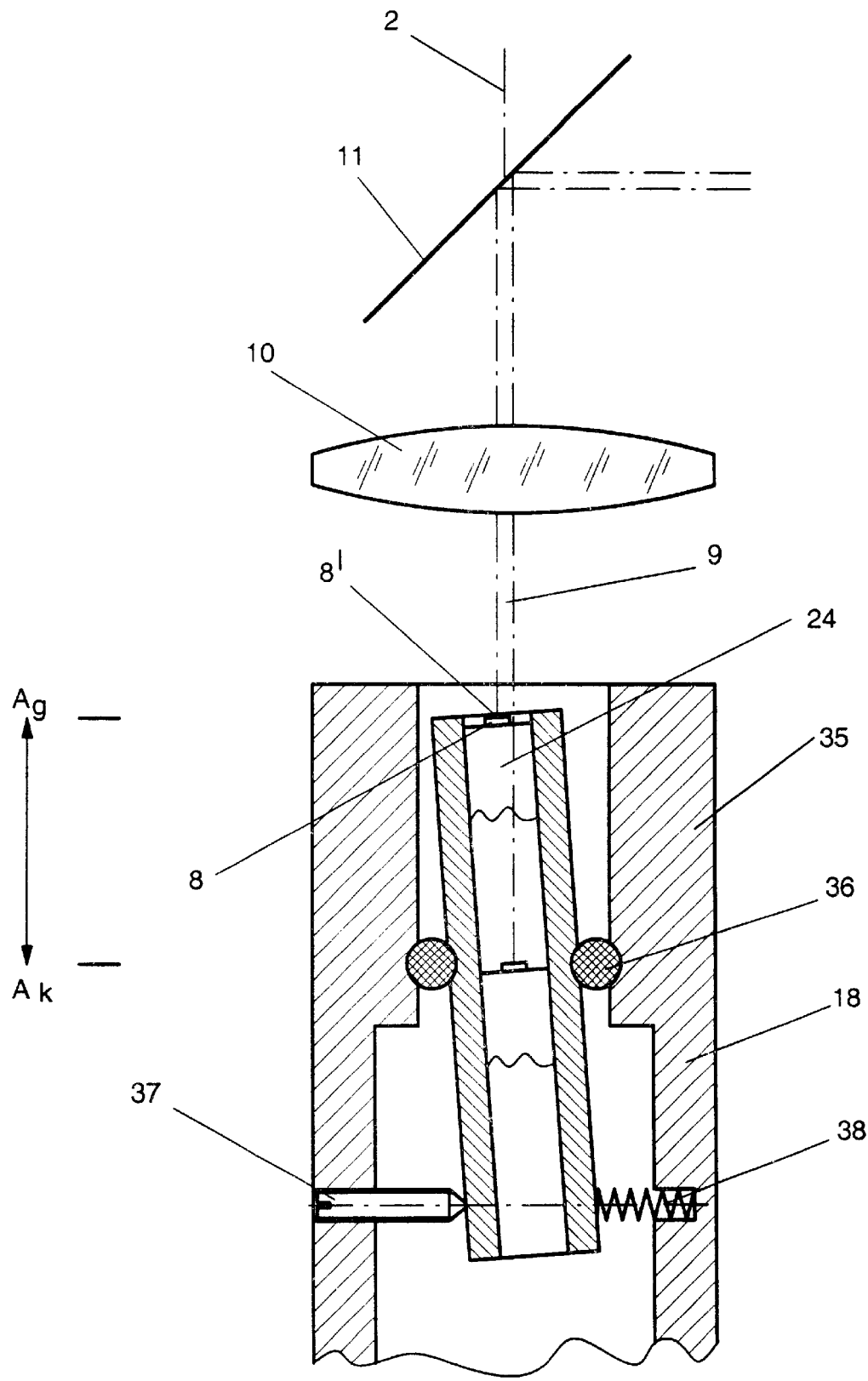
FIG. 4 is an exemplary embodiment of an apparatus for correcting optical beam paths.

FIG. 4 shows an advantageous development of the apparatus for displacing the light conductor 7. The development is an additional correction unit for the optical beam paths in the two axial working positions $A_k$ and $A_g$ of the light exit face 8 of the light conductor 7.

The correction unit is composed of a hollow-cylindrical adjustment sleeve 35 in the interior of which the light conductor mount 24 of the light conductor 7 is guided in sliding fashion and is displaceable essentially in the direction of the rotational axis 2 onto the two axial working positions $A_k$ and $A_g$.

The adjustment sleeve 35 is pendularly seated by a Cardanic bearing 36 inside the hollow-cylindrical arm 18 of the feed support 17. The Cardanic bearing 36 is realized for example, by a rubber ring, such as an O-ring. Due to the pendular bearing 36, the adjustment sleeve 35 can be inclined by small angles, as a result whereof the light exit face 8 of the light conductor 7 can be displaced by small amounts in two coordinate directions in a plane perpendicular to the rotational axis 2 of the scanner drum 1 for the purpose of implementing fine adjustments. As a result thereof, the light beam 9 emerging from the light exit face 8 is offset nearly parallel to the rotational axis 2, and the illumination spot 12 is shifted on the transparency master 5 such that the illumination spot 12 always centrally and, thus, optimally illuminates the scanner diaphragm 16 in the scanner element 15 in an advantageous rate despite existing, mechanical and/or optical tolerances in the different radial working positions $B_k$ and $B_g$ of the scanner objective 14.

The slant of the adjustment sleeve 35 within the inner arm 18 and, thus, the displacement of the light beam 9 is modified, for example, by two adjustment screws 37 in combination with a compression spring 38, and the optimum position is fixed by the adjustment screws, whereby the two adjustment screws 37 and the compression spring 38 respectively attack at the circumference of the adjustment sleeve 35 offset by 120°.

In a preferred way, the plane of the Cardanic bearing 36 Cardanic axis of the adjustment sleeve 35 is located in one of the axial working positions $A_g$ or $A_k$ of the light exit face 8 of the light conductor 7, for example in the axial working position $A_k$ for the scanner drum 1 having the smaller diameter. The optimum position of the light exit face 8 for this axial working position $A_k$ is determined by a one-time mechanical adjustment of the overall inner arm 18 of the feed support 17, this being maintained even given repeated approach of this selected, axial working position $A_k$. Only the locating of the optimum position of the light exit face 8 in the other axial working position $A_g$ thus occurs with the adjustment sleeve 35, whereby the adjustment for the selected, axially working position $A_g$ is maintained, so that an involved, iterative setting to the two axial working positions $A_g$ and $A_k$ is advantageously eliminated.

Although various minor modifications might be suggested by those skilled in the art, it should be understood that our wish to embody within the scope of the patent warranted hereon all such modifications as reasonably and properly come with the scope of our contribution to the art.

We claim as our invention:

1. An apparatus for point-by-point and line-by-line, opto-electronic scanning of a master, comprising:
    a scanner drum for chucking a master to be scanned;
    an illumination unit for generating an illumination spot with a scan light on the master;
    a scanner objective;
    a scanner element for converting the scan light modulated with a content of the master and focused with the scanner objective into an image signal;
    a feed support at which the illumination unit, the scanner objective and the scanner element are arranged, whereby the feed support implements a feed motion in a direction of a rotational axis of the scanner drum for scanning of the master;
    the illumination unit comprises a light conductor aligned substantially in a direction of a rotational axis of the scanner drum and having a light exit face for generating a light spot and a matching objective for imaging the light spot onto the master as the illumination spot; and
    at least a sub-section of the light conductor is seated inclinable by small angles relative to the rotational axis in the region of the light exit face for fine adjustment of optical beam paths, as a result whereof the illumination spot is displaced on the scanner drum.

2. The apparatus according to claim 1 wherein the sub-section of the light conductor is pendularly seated with a Cardanic bearing.

3. The apparatus according to claim 1 wherein a fixing structure is provided with which an optimum slant of the light conductor can be fixed.

4. The apparatus according to claim 1 wherein for correcting a size of the illumination spot given employment of scanner drum with different diameters, at least one sub-section of the light conductor is displaceable in the direction of the rotational axis into axial working positions predetermined by a respective diameter of the scanner drums being displaceable in the region of the light exit face relative to the matching objective.

5. The apparatus according to claim 4 wherein a plane of the Cardanic bearing lies in one of the axial working positions.

6. The apparatus according to claim 1 wherein:
    the scanner drum is designed transparent for scanning of the transparency master;
    the displaceable feed support comprises first and second arms proceeding parallel to the rotational axis, the first arm projecting centrally from an end face into the scanner drum;
    the second arm carries the scanner objective and the scanner element, and the first arm carries the illumination unit for generating the illumination spot; and
    the illumination unit additionally comprises a deflection mirror oriented transversely relative to the rotational axis.

7. The apparatus according to claim 6 wherein:
    an end region of the light conductor is enveloped by a cylindrical light conductor mount at the light exit face;
    a light conductor mount is displaceably seated onto axial working positions in an interior of a hollow-cylindrical adjustment sleeve;
    at least the first arm of the feed support carrying the light conductor is designed hollow-cylindrically in an interior region thereof; and
    the adjustment sleeve is pendularly seated by small angles around a rotational axis with the Cardanic bearing in the hollow-cylindrical interior region of the first arm.

8. The apparatus according to claim 7 wherein:
    the light conductor is displaceable with a displacement structure; and
    the displacement structure is actuated with an actuating drive.

9. The apparatus according to claim 8 wherein the actuating drive is attached to the feed support.

10. The apparatus according to claim 6 wherein the first arm of the feed support carrying the illumination unit projects as an inner arm into the respective scanner drum at the end face.

11. The apparatus according to claim 10 wherein:

the respective scanner drum can be clamped into the scanner device with a clamp mechanism;

the clamp mechanism is driven rotationally by a rotational drive; and the inner arm of the feed support is guided into the respective scanner drum by the rotational drive and the clamp mechanism.

12. The apparatus according to claim 1 wherein the illumination unit is supplied via the light conductor by a light source located at the feed support.

13. The Apparatus according to claim 1 wherein:

the scanner objective is mounted on an objective holder seated displaceable in the direction of the optical axis; and the objective holder with the scanner objective is displaced into a specific, radial working position determined by a diameter of the respective scanner drum for correcting a focusing of the scan light onto the scanner element given employment of scanner drums having different diameters.

14. The apparatus according to claim 13 wherein the objective holder is displaced with an actuating drive.

15. The apparatus according to claim 1 wherein the rotational axis of the respective scanner drum is aligned perpendicular to a floor space of the scanning apparatus.

16. A method for opto-electronic scanning of a master, comprising the steps of:

attaching a master to be scanned to a scanner drum;

generating an illumination spot with a scan light on the master;

converting with a scanner element the scan light modulated with a content of the master into an image signal;

providing a feed support at which the illumination unit and the scanner element are arranged, and with the feed support, implementing a feed motion in a direction of a rotational axis of the scanner drum for scanning of the master;

providing a light conductor aligned substantially in a direction of a rotational axis of the scanner drum and having a light exit face, and generating with the light conductor a light spot which is imaged onto the master as the illumination spot; and seating at least a sub-section of the light conductor inclinable by small angles relative to the rotational axis in a region of the light exit face for fine adjustment of optical beam paths, as a result whereof the illumination spot is displaced on the scanner drum.

* * * * *